(12) United States Patent
Erkkilä et al.

(10) Patent No.: US 7,023,169 B2
(45) Date of Patent: Apr. 4, 2006

(54) METHOD FOR CHANGING SPEED OF MOTOR GROUP

(75) Inventors: Ilkka Erkkilä, Helsinki (FI); Juhani Väänänen, Vantaa (FI)

(73) Assignee: ABB Oy, Helsinki (FI)

( * ) Notice: Subject to any disclaimer, the term of this patent is extended or adjusted under 35 U.S.C. 154(b) by 263 days.

(21) Appl. No.: 10/228,985

(22) Filed: Aug. 28, 2002

(65) Prior Publication Data

US 2003/0057915 A1 Mar. 27, 2003

(30) Foreign Application Priority Data

Sep. 3, 2001 (FI) .............................. 20011752

(51) Int. Cl.
*H02P 1/26* (2006.01)
*H02P 5/04* (2006.01)
*H02P 5/28* (2006.01)

(52) U.S. Cl. ....................... 318/779; 318/111; 318/112; 318/113; 318/778

(58) Field of Classification Search ......... 318/111–113, 318/700–800
See application file for complete search history.

(56) References Cited

U.S. PATENT DOCUMENTS 4,353,015 A * 10/1982 Krampe et al. ............... 318/41
4,602,195 A * 7/1986 Eberle et al. .......... 318/568.11
6,281,649 B1 8/2001 Ouellette et al.

FOREIGN PATENT DOCUMENTS

EP 0641067 3/1995

OTHER PUBLICATIONS

Patent Abstracts of Japan, vol. 2000, No. 9 (Oct. 13, 2000) of JP 2000 166259 A (Fuji Electric Co. Ltd), Jun. 16, 2000.

* cited by examiner

*Primary Examiner*—Marlon T. Fletcher
*Assistant Examiner*—Tyrone Smith
(74) *Attorney, Agent, or Firm*—Dykema Gossett PLLC

(57) ABSTRACT

A method for changing the speed of a motor group, in particular for starting or stopping it, the motor group comprising a plurality of squirrel-cage induction motors or synchronous motors and network converters arranged for their control, when the nominal supply power ($P_{ns}$), the acceleration power ($P_{acct}$) at the final speed ($V_{max}$) of the motors and the losses ($P_{loss}$) of the used power are known. On starting, the method comprises the steps of determining a first time instant ($T_1$), when the motor input power corresponds to the nominal supply power, acceleration taking place at a predetermined acceleration rate ($a_1$), accelerating the motors up to the first time instant ($T_1$) substantially at the predetermined acceleration rate ($a_1$), calculating a base value for the acceleration rate ($a_2$) as a function of the speed (v) of the motors, at which acceleration rate the motor input power (P) corresponds to the nominal supply power ($P_{ns}$), and accelerating the motors with varying acceleration rate ($a_2$) after the first time instant ($T_1$) so as to achieve the final speed ($V_{max}$).

4 Claims, 3 Drawing Sheets

METHOD FOR CHANGING SPEED OF MOTOR GROUP

BACKGROUND OF THE INVENTION

The invention relates to a method for changing the speed of a motor group, in particular for starting or stopping it, the motor group comprising a plurality of squirrel-cage induction motors or synchronous motors and network converters arranged for their control, when the nominal supply power, the acceleration power at the final speed of the motors and the losses of the used power are known.

In several fields of industry it is necessary to start a plurality of electric motors simultaneously. For instance, in paper or metal industry, a plurality of motors are connected to form groups, which should be controlled in a uniform manner, because the groups are mechanically interconnected. For instance, one such group is a drying section of a paper machine, in which a plurality of cylinders driven by motors are mechanically interconnected.

A torque required for accelerating heavy groups of this kind is considerably higher than the torque required for normal production run. Traditionally, heavy groups are started one group at a time and the starting of one group takes about 5 minutes, depending on the final speed. In general, the starting is implemented by controlling the motors with a linear acceleration ramp using a constant torque.

In a large group-drive installation, such as in connection with a paper machine, power supply to the motors is divided into sections that are called supply units or supply groups. One supply unit supplies electric power to a plurality of different electric drives, i.e. through a motor control device to the motors. The supply unit includes various electric devices, such as transformers, bridge coils or high-voltage cables, feed converters and protective devices.

The supply group is electrically rated on the basis of the continuous drive load, which is determined on the basis of the sum of the products of the mechanical torques and speeds required in the production, by using typical coefficients determined for the drive groups in the adding operation.

In connection with motor groups, a conventional drive solution consists of a phase-angle-controlled DC drive that always takes the same nominal power from the network with constant torque, the nominal power being the vector sum of the effective power and the idle power. This means that the supply devices have to be rated on the basis of the nominal power in connection with the DC drive.

A more up-to-date drive solution is an AC drive, whose input power consists, in practice, of only effective power, making a better use of supply group components. The torque being constant, the effective power increases linearly as the speed increases. The AC drive has a separate network converter, which is used for electronic power rectification for all separate converters controlling the motors. Because in connection with AC drives there is practically no idle power, large installations, such as the paper machine, need at least one supply group less than the DC drives.

In connection with current paper machines, drying section felt draws are arranged such that several drying sections have to be started at the same time. Thus, it is not possible to use the conventional starting method based on linear acceleration, because at the final stage of the start-up the linear ramp requires considerably higher power than the design power, which results in overloading in front devices, such as supply transformer or supply converter, of the drying section frequency converters. This can be avoided by considerably overrating the front devices of the supply such that a sufficient number of supply transformers and supply units are selected to make sure that their actual power is sufficient to supply all the groups to be started simultaneously also at the final part of the acceleration ramp. However, the overrating increases the costs of devices that are only needed momentarily in the start-up. In addition, the overrating requires considerably more space for the devices.

BRIEF DESCRIPTION OF THE INVENTION

The object of the invention is to provide a method for starting a motor group, which method avoids the above drawbacks and enables the start-up of a heavy motor group, without overrated apparatuses, in a simple and reliable manner. This is achieved with a method of the invention, which is characterized by comprising, on starting, the steps of determining a first time instant when the motor input power corresponds to the nominal supply power, acceleration taking place at a predetermined acceleration rate; accelerating the motors up to the first time instant, substantially at the predetermined acceleration rate; calculating a base value for the acceleration rate as a function of the speed of the motors, at which acceleration rate the motor input power corresponds to the nominal supply power; and accelerating the motors with varying acceleration rate after the first time instant so as to achieve the final speed.

The invention is based on the idea that the starting of the motor group is implemented by first accelerating the motors substantially at a constant acceleration rate until a thermal power of the supply group is achieved, whereafter acceleration is adjusted such that the supply group remains at said power limit. An advantage with the method of the invention is that for starting the group the heavy motor group input need not be provided with overrated front devices. The cost saving that will thus be achieved is considerable.

By using the method of the invention, the starting time is longer than by using the prior art, if the prior art front devices of the supply are overrated in the above-described manner. But if a prior art starting method is employed using front devices of standard design, it is not possible to start the whole group at the same time. The method of the invention implements the starting of the heavy group in an optimal manner utilizing the total capacity of the front devices of the converters.

BRIEF DESCRIPTION OF THE DRAWINGS

In the following the invention will be described in greater detail in connection with preferred embodiments, with reference to the attached drawings, wherein.

DETAILED DESCRIPTION OF THE INVENTION

Figure 1:
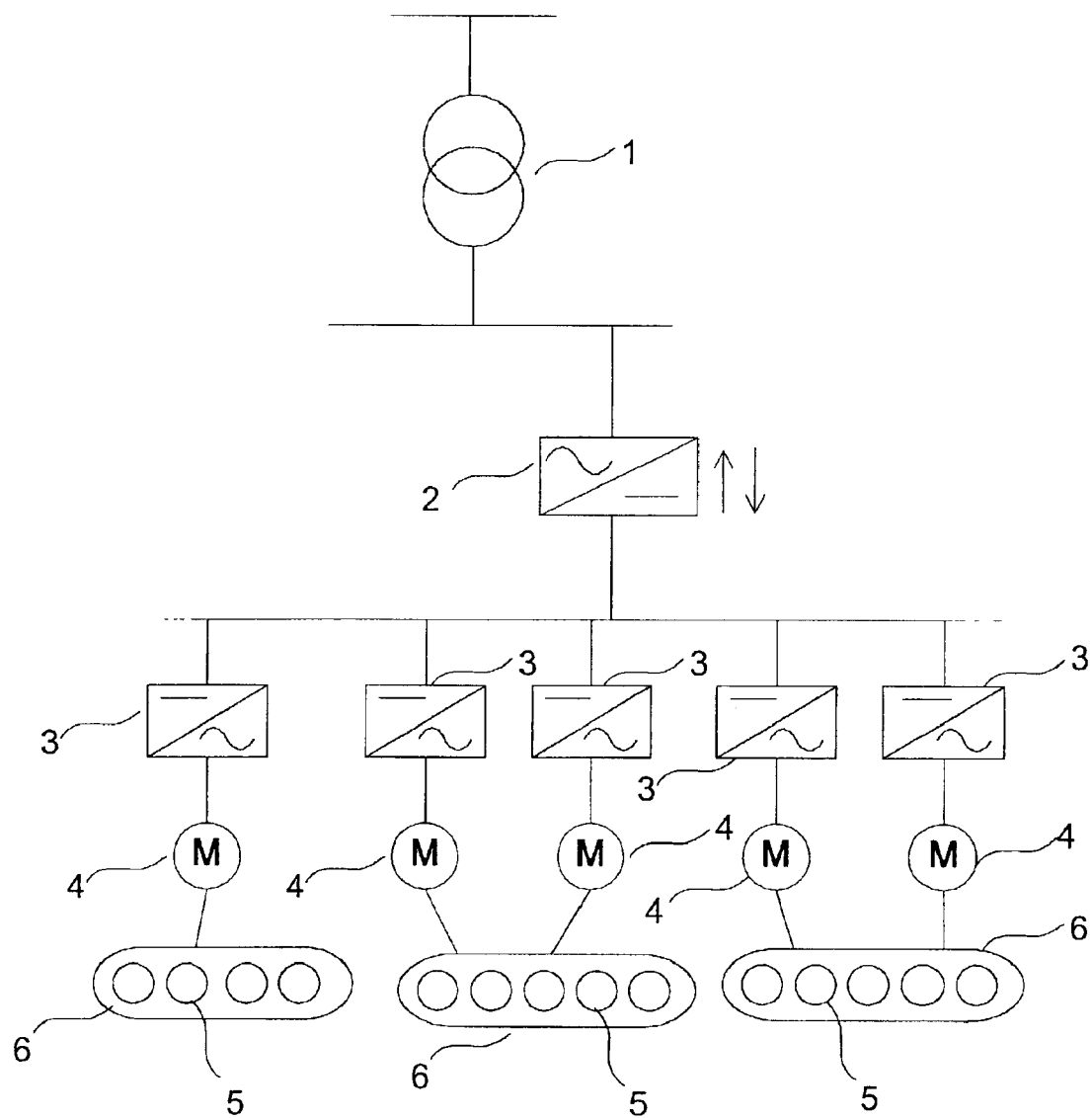
FIG. 1 is a schematic view of a supply group.

FIG. 1 shows in principle the structure of a supply group used for group drive. The supply group is supplied through a supply transformer 1. The supply transformer supplies low-voltage AC current to rails, to which one or more supply converters 2 are connected. The function of the supply converters is to generate DC voltage for separate network converters 3 that are coupled to control group drive motors 4. One motor may rotate a plurality of rolls 5 or cylinders such that the motor axle is actually attached to one roll or cylinder, and the other rolls rotated by the motor are mechanically connected to the rotated roll in order to run the whole set of rolls 6.

FIG. 1 shows three separate roll groups 6 that five combinations of motors 4 and inverters 3 are arranged to control. For instance, a whole of this kind may constitute one group, whose speed should be adjusted uniformly in all circumstances. In connection with group drives the motor speed refers to the web speed of a sequence of rolls rotated by the motors. It is simple to change the web speed into an angular velocity of the motor or the roll as the radii of the rolls are known.

In the solution shown in FIG. 1 and known per se, the converters used, both the power supply converter 2 and the inverters 3, enable deceleration of the motors as generators such that the deceleration power is fed back to a DC intermediate circuit for the use of other inverters, or through the DC intermediate circuit and the power supply converter up to the supplying network. Inverters transferring energy in two directions are commonly known as network converters.

Figure 2:
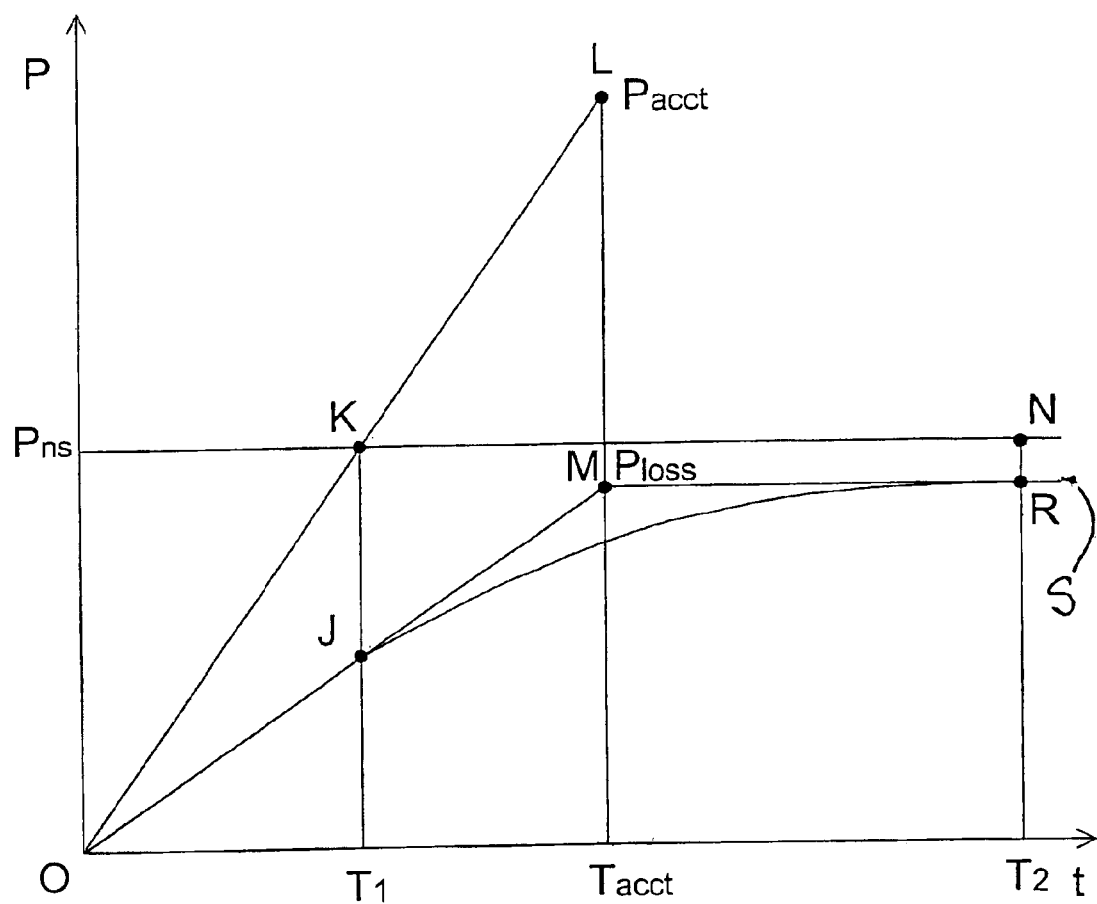
FIG. 2 is graphical representation of power as a function of time in connection with the method of the invention.

In the following, the method of the invention will be described with reference to the graphical representation in FIG. 2 on power P as a function of time t in connection with acceleration. The power in FIG. 2 is the total power of a single group drive, i.e. of a heavy motor group, which is started at the same time. FIG. 2 is only intended for geometric observation and easy understanding of the invention, and thus it does not represent any actual system.

Because the graph of FIG. 2 represents power as a function of time, the area of the graph represents energy, either kinetic energy of the masses or work done to cover the losses. In FIG. 2, the height $P_{acct}$ of the triangle $O.T_{acct}.L$ is acceleration power at the final speed $V_{max}$, the acceleration being a linear ramp, i.e. the acceleration rate being constant. The final speed $V_{max}$ is achieved in time $T_{acct}$. Currently frequency converters have various basic features, the linear acceleration of motors being one of the most common features. In other words, the frequency converter can be controlled by a base value of acceleration.

The portion $T_{acct}M=P_{loss}$ of the power $P_{acct}$ represents losses and the portion ML represents power necessary for increasing kinetic energy. Both of said portions are initial values used in designing group drives, such as groups of a paper machine, and hence they are known values.

Further, in FIG. 2, the height $P_{ns}$ of the triangle O.T1.K is the nominal supply power that is achieved at time instant T1 with linear acceleration. Thus, the maximum power $P_{acct}$ of the linear acceleration is much higher than the nominal supply power $P_{ns}$. The area of the triangle O.M.L. represents kinetic energy at the final speed $V_{max}$ and the area of the triangle O.J.K represents kinetic energy at speed $V_1$, which is achieved at time instant $T_1$, the acceleration being a linear ramp. Because the magnitude of losses increases in direct proportion to speed with constant torque, it is possible to determine $$V_1 = \frac{P_{ns}}{P_{acct}} V_{max} \quad (1)$$

and $$T_1 = \frac{P_{ns}}{P_{acct}} T_{acct}. \quad (2)$$

According to the invention, there is determined a first time instant $T_1$, when the motor input power corresponds to the nominal supply power, acceleration taking place at a predetermined acceleration rate $a_1$. The acceleration rate $a_1$ is selected such that it represents the rate by which the motors are accelerated fast to the maximum motor input power. The acceleration rate should be such that it is safe for operations and mechanical parts to be accelerated. Advantageously the acceleration rate $a_1$ is selected to be $a_1=V_{max}/T_{acct}$, by which the inverters are controlled at an interval $0-T_1$. At this interval, dissipation power changes along the line segment OJ.

After time instant $T_1$, the acceleration of the motors to the final speed has to be implemented in some other way than by continuing the linear acceleration, because at time instant $T_1$ the motor input power has reached the nominal supply power. According to the invention, a base value for the acceleration rate $a_2$ is calculated as a function of the speed v of the motors, at which acceleration rate the motor input power corresponds to the nominal supply power.

At time instant $T_1$ power limitation takes place, which follows the straight line KN of FIG. 2 at the power limit $P_{ns}$ instead of linearly increasing power KL. Because power is limited, acceleration rate declines and speed rises slower. In FIG. 2 the curve JR shows how losses grow after time instant $T_1$. As stated above, losses and speed grow in a given proportion to one another, so the curve form of speed corresponds to that of losses. According to the invention, the power is limited by calculating an acceleration rate value, which keeps the power within the allowed value.

The target for the final speed is $V_{max}$. By linear acceleration the final speed would be achieved at time instant $T_{acct}$, if there were available power. In that case the increase in kinetic energy necessary for the acceleration from time instant $T_1$ is, as it is shown in FIG. 2, the area of the trapezoid J.K.L.M. Because the same increase in kinetic energy is necessary for accelerating the same mass to the same final speed irrespective of the acceleration rate, the areas of the trapezoid J.K.L.M and the trapezoid J.K.N.R with a curved side correspond. The trapezoid with a curved side is limited to time instant $T_2$ (line segment NR), when the desired final speed $V_{max}$ has been achieved.

In FIG. 2 the area of the triangle O.L.M, i.e. the kinetic energy is $$\frac{1}{2}(P_{acct} - P_{loss})T_{acct} = \frac{1}{2}m'V_{max}^2, \quad (3)$$

and the equation is solved for the reduced mass m' by $$m' = T_{acct}\left(\frac{P_{acct} - P_{loss}}{V_{max}^2}\right). \quad (4)$$

Next, the reduced mass m' is placed in an equation of motion $$P_{ns} = P_{loss}\frac{v}{V_{max}} + m'\frac{dv}{dt}v, \quad (5)$$

where v is a momentary web speed. The first term in the equation represents the magnitude of losses at speed v and the second term is derived from the basic equation of power $$P = \frac{W}{t} \text{ as follows } P = \frac{W}{t} = \frac{Fs}{t} = \frac{mas}{t} = m\frac{dv}{dt}v.$$

After placing the reduced mass in the equation and taking equation (1) into account, a base value of acceleration dv/dt for time interval $T_1-T_2$ is given by $$\left(\frac{dv}{dt}\right) = \frac{(P_{ns}V_{max}^2)(V_1 P_{acct} - P_{loss}v)}{T_{acct}(P_{acct} - P_{loss})(vV_1 P_{acct})}. \quad (6)$$

According to the invention, the motors are accelerated with acceleration rate $a_2$ after the first time instant $T_1$. Advantageously, the previously calculated value (dv/dt) is selected as the acceleration rate $a_2$.

The speed changes in the manner determined by the acceleration base value at time interval $T_1$–$T_2$. At time instant $T_2$ the desired final speed $V_{max}$ has been achieved, whereafter the acceleration rate will have the value 0. After terminated acceleration, the power declines along the line segment NR in FIG. 2 and continues in the direction of the line MR with magnitude $P_{loss}$. Thus, the power to be used declines to the level of dissipation power, because the target speed has been achieved and work needs to be done only to compensate for the losses.

The length of the time interval $T_1$–$T_2$ can be solved by placing the reduced mass m' in the equation of motion (5) and by integrating the equation for variables t and v.

Figure 3:
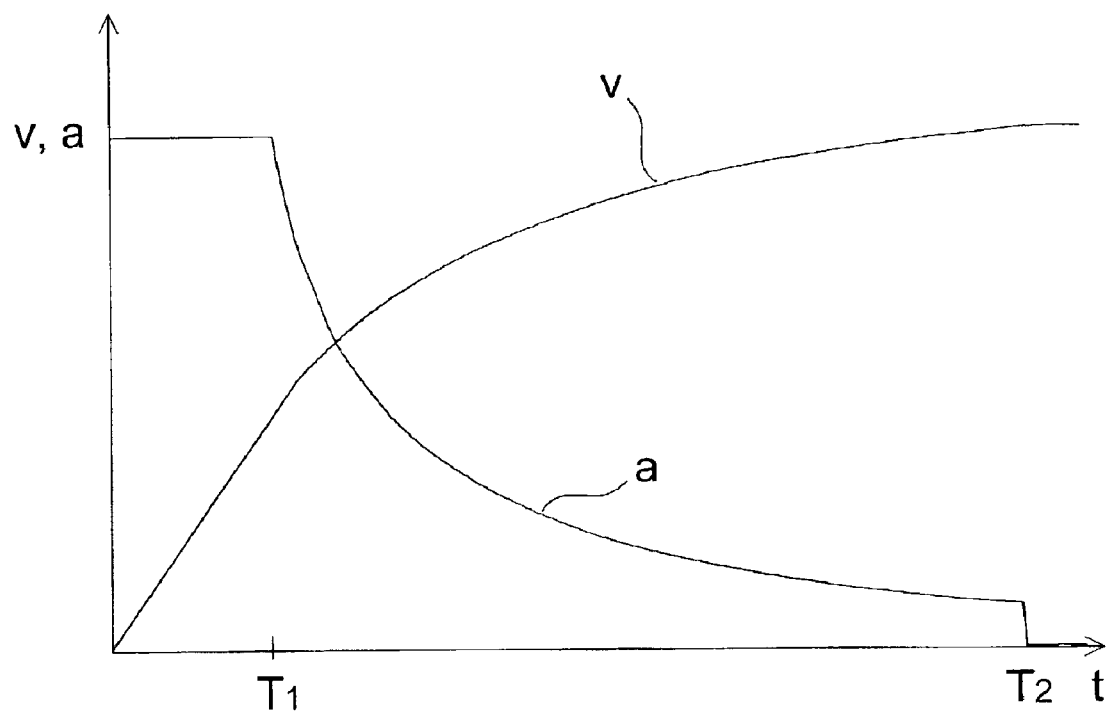
FIG. 3 represents speed and acceleration rate as a function of time in connection with the method of the invention.

By way of example, FIG. 3 shows how speed and acceleration behave as a function of time when the method of the invention is implemented. The solution of FIG. 3 is only intended to illustrate curve forms in principle, not simulation or measurement results of any particular assembly. As it can be seen in FIG. 3, the acceleration rate is kept substantially constant up to the time instant $T_1$, during which time the speed rises linearly. After the time instant $T_1$ the acceleration rate is reduced for keeping within the power limit, and consequently the speed rises slower until, at the time instant $T_2$, the speed achieves the final speed $V_{max}$.

The method of the invention can also be applied to decelerate or stop a heavy motor group. In that case, the deceleration is first performed at the power limit such that deceleration rate is controlled to a level at which the power P generated by the motors remains at the power limit $P_{ns}$ when the motors decelerate. Thus the speed changes as determined by the deceleration base value. As stated above, the converters associated with the drives according to the invention are provided with bi-directional bridges, which allow the motors to decelerate power back to the network.

After the motors have achieved a speed that allows safe deceleration to zero speed using a linear ramp, this deceleration method will be adopted. The same goes for linear deceleration as for linear acceleration, in other words the deceleration rate must not be so high that it would damage the mechanical parts of the machines. For clarity, it is possible to use the same time limits for changing the deceleration methods in connection with the deceleration as in connection with the acceleration, but in reverse order. Thus, it can be considered that the deceleration begins at time instant $-T_2$ and it is started at the power limit. At time instant $-T_1$ linear deceleration is adopted and the motors stop at time instant 0.

It is apparent to a person skilled in the art that the basic idea of the invention can be implemented in a variety of ways. Thus, the invention and its embodiments are not restricted to the above examples, but they may vary within the scope of the claims.

What is claimed is:

1. A method for changing the speed of a motor group, in particular for starting or stopping it, the motor group comprising a plurality of squirrel-cage induction motors or synchronous motors and network converters arranged for their control, when the nominal supply power, the acceleration power at the final speed of the motors and the losses of the used power are known, on starting, the method comprising:

determining a first time instant, when the motor input power corresponds to the nominal supply power, acceleration taking place at predetermined acceleration rate;

accelerating the motors up to the first time instant substantially at the predetermined acceleration rate;

calculating a base value for the acceleration rate as a function of the speed of the motors, at which acceleration rate the motor input power corresponds to the nominal supply power;

accelerating the motors with varying acceleration rate after the first time instant so as to achieve the final speed, and wherein the redetermined acceleration rate to reach a final $V_{max}$ is determined by calculating $V_{max}/T_{acct}$ is the time that elapses to accelerate the group with constant torque to the final speed at the acceleration power.

2. The method of claim 1 comprising: calculating a base value for the deceleration rate as a function of the motor speed, at which deceleration rate the power generated by the motors corresponds to the nominal supply power;

decelerating the motors with varying deceleration rats up to the first time instant, when the deceleration has achieved a predetermined value;

decelerating the motors at the predetermined deceleration rate after the time instant.

3. The method of claim 1 wherein the motor group is a drying group of a paper machine drying section.

4. A method for changing the speed of a motor group, in particular for starting or stopping it, the motor group comprising a plurality of squirrel-cage induction motors or synchronous motors and network converters arranged for their control, when the nominal supply power, the acceleration power at the final speed of the motors and the losses of the used power are known, on starting, the method comprising:

determining a first time instant, when the motor input power corresponds to the nominal supply power, acceleration taking place at a predetermined acceleration rate;

accelerating the motors up to the first time instant substantially at the predetermined acceleration rate:

calculating a base value for the acceleration rate as a function of the speed of the motors, at which acceleration rate the motor input power corresponds to the nominal supply power;

accelerating the motors with a varying acceleration rate after the first time instant so as to achieve the final speed; and wherein the base value for the acceleration rate as a function of speed is determined by:

$$a_2 = \frac{(P_{ns}V_{max}^2)(V_1 P_{acct} - P_{loss}v)}{T_{acct}(P_{acct} - P_{loss})(vV_1 P_{acct})},$$

where V1 is the speed at the fist time instant; $P_{ns}$ is the nominal or maximum power; $V_{max}$ max is the final speed; $V_1$ is the velocity at time $T_1$: $P_{acct}$ is the acceleration power to reach the final speed; $P_{loss}$ is the power loss in the machine; v is the velocity.

* * * * *